UNITED STATES PATENT OFFICE.

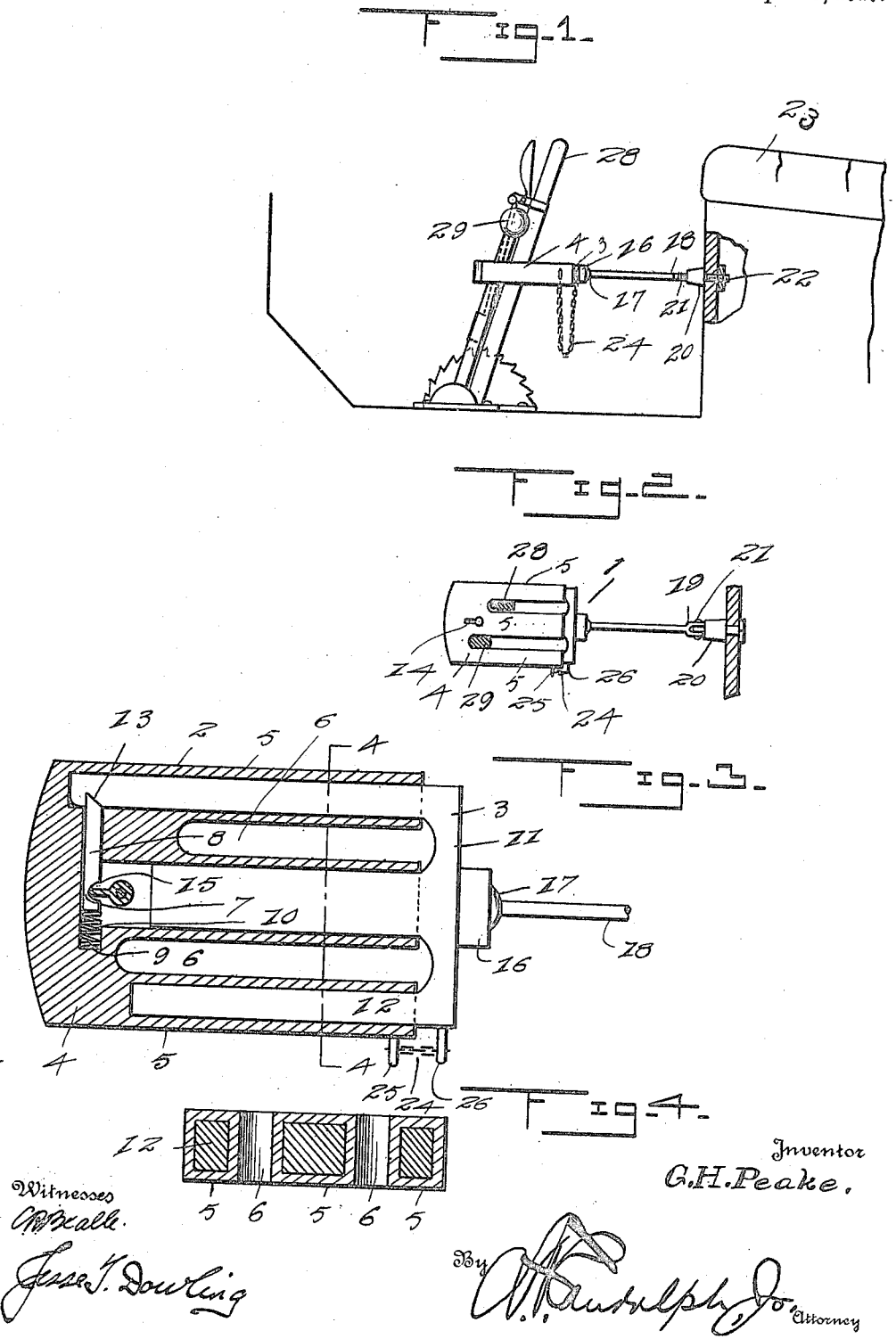

GEORGE H. PEAKE, OF CREEDE, COLORADO.

AUTOMOBILE-LOCK.

1,222,456.  Specification of Letters Patent.  Patented Apr. 10, 1917.

Application filed August 25, 1916. Serial No. 116,867.

*To all whom it may concern:*

Be it known that I, GEORGE H. PEAKE, a citizen of the United States, residing at Creede, in the county of Mineral and State of Colorado, have invented certain new and useful Improvements in Automobile-Locks; and I do hereby declare the following to be a full, clear, and exact description of the invention, such as will enable others skilled in the art to which it appertains to make and use the same.

The object of this invention is to provide a lock which will effectively lock the brake and gear shift levers against movement by unauthorized persons.

A further object of this invention is the provision of a pair of telescoping members which are provided with slots in which are positioned levers and is also provided with a locking means which holds the members against separation to prevent the use of the car by unauthorized persons.

A still further object of this invention is to provide a pair of telescoping members, one of the members provided with a novel rod which permits the attaching of the same to the seat of an automobile in the rear of the levers so that the members may be telescoped over the levers and hold the same against movement.

A still further object of the invention is to provide an automobile lock of this character which will be simple, practical and a comparatively inexpensive structure to manufacture.

With these and other objects in view, the invention consists in the novel combination and arrangement of parts hereinafter more fully described and pointed out in the claim hereto appended.

In the drawing

Figure 1 is a side elevation partly in section of my improved lock constructed in accordance with this invention and shown applied to an automobile, Fig. 2 is a top plan view of the same, Fig. 3 is an enlarged horizontal sectional view, and Fig. 4 is a transverse sectional view taken on the line 4—4 of Fig. 3.

Like numerals of reference designate corresponding parts in all the figures of the drawing.

Referring more particularly to the drawing, the numeral 1 designates the lock in its entirety which comprises in its construction telescoping members 2 and 3, the member 2 comprises the end portion 4 and the spaced tubular members 5 which are substantially rectangular in cross section as clearly shown in Fig. 4 of the drawing. The members 5 define the lever slots 6, and the end portion 4 of the member 2 is provided with a transverse slot 7 in which is positioned the sliding bolt 8. A coiled spring 9 is fitted in the inner end of the slot 7 as at 10 and has one end engaging the bolt 8 to normally urge the same into one of the tubular members 5.

The member 3 comprises the end wall 11 and the spaced solid members 12 which members are adapted to telescope into the hollow tubular members 5, one of the members 12 provided near its ends with a recess 13 in which is fitted the sliding bolt 8 when the members are assembled or telescoped together. The member 4 is provided intermediate of its ends with a key hole slot 14 and the sliding bolt is provided near its inner end on one longitudinal side with a key receiving opening 15 in which a key is adapted to move for moving the bolt inwardly against the tension of the spring to permit the members 3 to be released and removed from the member 4.

Connected to the member 3 intermediate of its ends is a bearing 16 in which is fitted a ball 17 carrying the connecting rod 18. The opposite end of the connecting rod is bifurcated as at 19 and is adapted to receive therein the bolt stud 20 which is pivotally secured between the arms of the bifurcated end 19 of the rod 18 by the pivot bolt 21. The outer end of the stud 20 is provided with a bolt 22 which is adapted to extend through the seat of an automobile designated 23 for securing the members in the rear of the levers.

A flexible chain 24 has one end connected to the member 2 as at 25 and has its opposite end connected to the member 3 as at 26 thus preventing the members from being lost when not in assembled position.

The levers are designated 28 and 29 and are shown in Fig. 1 in their locked position, and the member 1 is secured thereto thus holding the levers against movement to prevent the car from being used by unauthorized persons.

In assembling the device for use, the bolted stud 20 is secured to the automobile seat as shown clearly in Fig. 1, and the member 3 is telescoped in the member 4 until one of the members 12 projects beyond the bolt 8 which engages the recess 13 thereby preventing the removal of the member 3 from the member 4 and the levers are securely held in the slot 6 and an unauthorized person cannot move the levers until the same is removed. The rod 18 having the ball and socket joint connection with the member 3 permits the placing of the members in various positions.

What is claimed is:

An automobile lever lock comprising a pair of telescoping members, one of said members comprising a connecting bar and spaced tubular extensions, the other of said members comprising a connecting bar and spaced extensions which are adapted to telescope into the tubular members of the first named member, a transversely arranged bolt carried by the first named member, said last named member comprising a recess into which said bolt is fitted for holding the members against separation, a flexible chain connected to each of said members to prevent separation of the same, and a connecting rod secured to one of said members securing the same to an automobile.

In testimony whereof I affix my signature in presence of two witnesses.

GEORGE H. PEAKE.

Witnesses:
W. T. JACKSON, Jr.,
WILLIAM A. FELLOWS.

Copies of this patent may be obtained for five cents each, by addressing the "Commissioner of Patents, Washington, D. C."